United States Patent
Lee et al.

(10) Patent No.: US 11,714,283 B2
(45) Date of Patent: Aug. 1, 2023

(54) OPTICAL APPARATUS AND NEAR-EYE DISPLAY APPARATUS INCLUDING THE SAME

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Changkun Lee, Seoul (KR); Seokil Moon, Seoul (KR); Byoungho Lee, Seoul (KR); Geeyoung Sung, Daegu (KR); Hongseok Lee, Seoul (KR)

(73) Assignees: SAMSUNG ELECTRONICS CO., LTD., Suwon-si (KR); SEOUL NATIONAL UNIVERSITY R&B FOUNDATION, Seoul (KR)

( * ) Notice: Subject to any disclaimer, the term of this patent is extended or adjusted under 35 U.S.C. 154(b) by 310 days.

(21) Appl. No.: 17/039,000

(22) Filed: Sep. 30, 2020

(65) Prior Publication Data
US 2021/0263318 A1    Aug. 26, 2021

(30) Foreign Application Priority Data
Feb. 24, 2020  (KR) .................. 10-2020-0022376

(51) Int. Cl.
G02B 27/01   (2006.01)
G02B 27/28   (2006.01)
G02B 27/00   (2006.01)

(52) U.S. Cl.
CPC ..... G02B 27/0172 (2013.01); G02B 27/0093 (2013.01); G02B 27/286 (2013.01);
(Continued)

(58) Field of Classification Search
CPC ........... G02B 27/0172; G02B 27/0093; G02B 27/286; G02B 2027/0123; G02B 2027/0147; G02B 2027/0178
(Continued)

(56) References Cited

U.S. PATENT DOCUMENTS 10,373,294 B1   8/2019  Wilson et al.
10,473,926 B2   11/2019 Lee et al.
(Continued)

FOREIGN PATENT DOCUMENTS

CN   109870811 A    6/2019
EP   3 492 962 A2   6/2019
(Continued)

OTHER PUBLICATIONS

Kim, Jonghyun et al., "Matching Prescription & Visual Acuity: Towards AR for Humans", Proceedings of SIGGRAPH '19 Emerging Technologies, Jul. 28, 2019-Aug. 1, 2019, Article 18, Los Angeles, CA., USA. (2 pages total).
(Continued)

Primary Examiner — Collin X Beatty
Assistant Examiner — Grant A Gagnon
(74) Attorney, Agent, or Firm — Sughrue Mion, PLLC

(57) ABSTRACT

An optical apparatus and a near-eye display apparatus including the same are provided. The optical apparatus includes a display panel configured to form an image, a first polarization rotator configured to electrically control a light emitted from the display panel to have a first polarization state, a first ¼ wave plate configured to convert the first polarization state of a light transmitted from the first polarization rotator to a second polarization state, and an optical element group configured to display a first image having a first viewing angle and a second image having a second viewing angle that is greater than the first viewing angle based on the second polarization state of a light transmitted from the first ¼ wave plate.

18 Claims, 11 Drawing Sheets

(52) U.S. Cl.
CPC ............... *G02B 2027/0123* (2013.01); *G02B 2027/0147* (2013.01); *G02B 2027/0178* (2013.01)

(58) Field of Classification Search
USPC ........................................................ 359/483
See application file for complete search history.

(56) References Cited

U.S. PATENT DOCUMENTS

| | | |
|---|---|---|
| 2018/0284451 A1 | 10/2018 | Eash et al. |
| 2019/0171005 A1 | 6/2019 | Lee et al. |
| 2020/0409156 A1* | 12/2020 | Sissom ................ G02B 27/017 |

FOREIGN PATENT DOCUMENTS

| | | |
|---|---|---|
| JP | 2019-101424 A | 6/2019 |
| KR | 10-2019-0065753 A | 6/2019 |
| KR | 10-2019-0088609 A | 7/2019 |

OTHER PUBLICATIONS

Kim, Jonghyun et al., "Foveated AR: Dynamically-Foveated Augmented Reality Display", ACM Trans. Graph., vol. 38, No. 4, Article 99, Jul. 2019, p. 99:1-99:15. (15 pages total).

* cited by examiner

OPTICAL APPARATUS AND NEAR-EYE DISPLAY APPARATUS INCLUDING THE SAME

CROSS-REFERENCE TO RELATED APPLICATION

This application claims priority from Korean Patent Application No. 10-2020-0022376, filed on Feb. 24, 2020, in the Korean Intellectual Property Office, the disclosure of which is incorporated herein in its entirety by reference.

BACKGROUND

1. Field

Example embodiments of the present disclosure relate to optical apparatuses that provide high resolution images with a narrow viewing angle and low resolution images with a wide viewing angle using one display panel, and near-eye display apparatuses including the optical apparatuses.

2. Description of Related Art

Virtual reality is a technology that enables a person to experience life in a computer-generated virtual world. Augmented reality is a technology that allows virtual images to be mixed with physical environments or spaces in the real world. Near-eye displays in which virtual reality displays or augmented reality displays are implemented focus a virtual image on a space using a combination of optical and stereoscopic images. In such near-eye displays, display resolution and processing are important.

Images displayed to a user through a near-eye display apparatus may include a virtual image including highly detailed graphics or a real image. When the near-eye display apparatus processes an image using a software method, image processing may be relatively slow due to a large amount of image processing calculation. To reduce the amount of calculation, a foveated display has been developed to provide a high resolution image to a fovea area in the center of a human's field of view and a low resolution image to the remaining peripheral area.

SUMMARY

One or more example embodiments provide optical apparatuses that provide high resolution images with a narrow viewing angle and low resolution images with a wide viewing angle using one display panel.

One or more example embodiments also provide near-eye display apparatuses that provide high resolution image with a narrow viewing angle and low resolution images with a wide viewing angle using one display panel.

Additional aspects will be set forth in part in the description which follows and, in part, will be apparent from the description, or may be learned by practice of example embodiments.

According to an aspect of an example embodiment, there is provided an optical apparatus including a display panel configured to form an image, a first polarization rotator configured to electrically control a light emitted from the display panel to have a first polarization state, a first ¼ wave plate configured to convert the first polarization state of a light transmitted from the first polarization rotator to a second polarization state, and an optical element group configured to display a first image having a first viewing angle and a second image having a second viewing angle that is greater than the first viewing angle based on the second polarization state of a light transmitted from the first ¼ wave plate.

The first image may include a high resolution fovea image, and the second image may include a low resolution peripheral image.

The optical element group may include at least one geometric phase lens configured to operate as a concave lens or a convex lens based on a polarization state of a light incident thereon.

The optical element group may include a first geometric phase lens set configured to transmit or diffuse light incident thereon, and a second geometric phase lens set configured to transmit or focus a light incident thereon.

The first geometric phase lens set may include a first geometric phase lens, a second geometric phase lens, and a first circular polarizer provided between the first geometric phase lens and the second geometric phase lens.

The second geometric phase lens set may include a third geometric phase lens, a fourth geometric phase lens, and a second circular polarizer provided between the third geometric phase lens and the fourth geometric phase lens.

The optical element group may further include a second ¼ wave plate, a second polarization rotator, and a third ¼ wave plate respectively provided between the first geometric phase lens set and the second geometric phase lens set.

The optical apparatus may further include at least one lens configured to image a light transmitted from the optical element group.

The first image and the second image may be sequentially synthesized and displayed as one image.

According to another aspect of an example embodiment, there is provided an optical apparatus including a display panel configured to form an image, a polarizer configured to convert a light emitted from the display panel to have at least one of a first linear polarization and a second linear polarization, a polarization beam splitter configured to transmit a first light having the first linear polarization and reflect a second light having the second linear polarization, and an optical element group configured to transmit the first light transmitted through the polarization beam splitter in a different path from the second light, wherein the first light displays a first image having a first viewing angle, and the second light displays a second image having a second viewing angle that is greater than the first viewing angle.

The first image may include a high resolution fovea image, and the second image may include a low resolution peripheral image.

The polarizer may include a polarization rotator or a patterned retarder.

The optical element group may include a first ¼ wave plate configured to convert a polarization of the first light passing through the polarization beam splitter, a first mirror configured to reflect the first light passing through the first ¼ wave plate back to the first ¼ wave plate, a second first ¼ wave plate configured to convert the polarization of the first light passing through the first ¼ wave plate and reflected by the polarization beam splitter, and a second mirror configured to reflect the first light passing through the second ¼ wave plate back to the second ¼ wave plate.

At least one of the first mirror and the second mirror may include a concave mirror.

According to yet another aspect of an example embodiment, there is provided a near-eye display apparatus including a pupil tracker configured to track a user's pupil, an optical apparatus configured to display a first image having a first viewing angle corresponding to a position of the user's pupil detected by the pupil tracker and a second image having a second viewing angle that is greater than the first viewing angle, and an optical element configured to direct the first image and the second image to user's eyes, wherein the optical apparatus includes a display panel configured to form an image, a first polarization rotator configured to electrically control a light emitted from the display panel to have a first polarization state, a first ¼ wave plate configured to convert the first polarization state of a light transmitted from the first polarization rotator to a second polarization state, and an optical element group configured to display the first image having the first viewing angle and the second image having the second viewing angle based on the second polarization state of a light transmitted from the first ¼ wave plate.

The first image may include a high resolution fovea image, and the second image may include a low resolution peripheral image.

The optical element group may include a first geometric phase lens set configured to transmit or diffuse a light, and a second geometric phase lens set configured to transmit or focus the light, wherein the first geometric phase lens set may include a first geometric phase lens, a second geometric phase lens, and a first circular polarizer provided between the first geometric phase lens and the second geometric phase lens, and wherein the second geometric phase lens set may include a third geometric phase lens, a fourth geometric phase lens, and a second circular polarizer provided between the third geometric phase lens and the fourth geometric phase lens.

The optical element group may further include a second ¼ wave plate, a second polarization rotator, and a third ¼ wave plate respectively provided between the first geometric phase lens set and the second geometric phase lens set.

The near-eye display apparatus may further include at least one lens configured to image a light transmitted from the optical element group.

The optical element may include a light guide plate or a hologram optical element.

The near-eye display apparatus may be implemented as an eyeglasses-type virtual reality apparatus, an eyeglasses-type augmented reality apparatus, or a head-up display.

BRIEF DESCRIPTION OF THE DRAWINGS

The above and/or other aspects, features, and advantages of certain example embodiments will be more apparent from the following description taken in conjunction with the accompanying drawings, in which.

DETAILED DESCRIPTION

Figure 1:
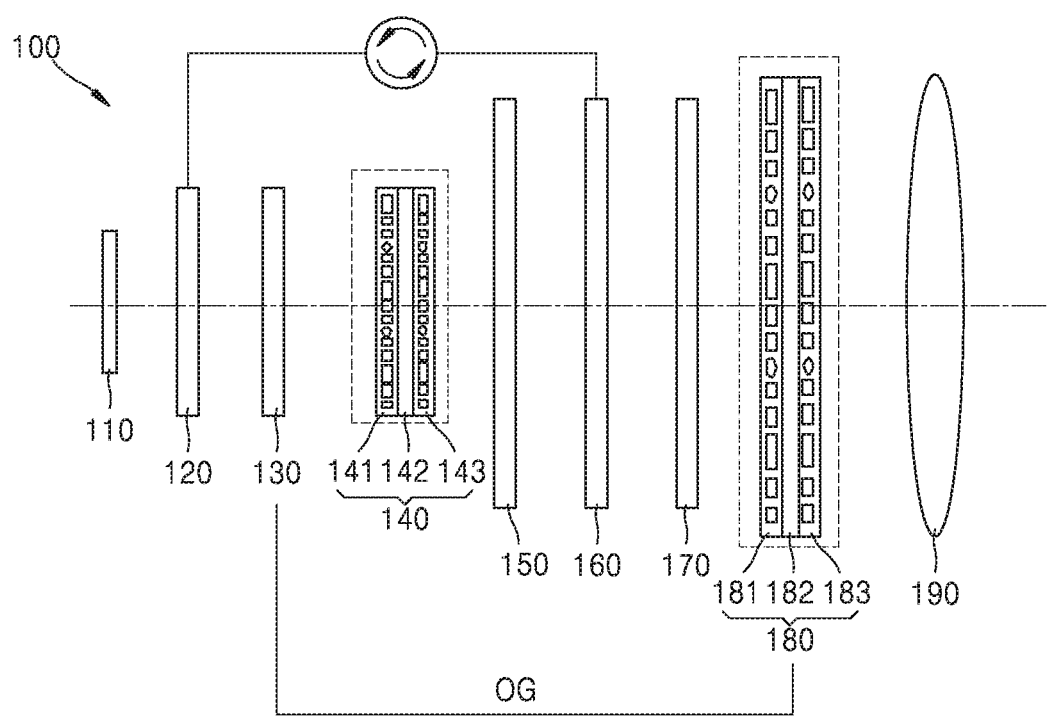
FIG. 1 illustrates an optical apparatus according to an example embodiment.

Reference will now be made in detail to example embodiments of which are illustrated in the accompanying drawings. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

An optical apparatus and a near-eye display apparatus including the same according to various example embodiments are described in detail with reference to the accompanying drawings. In the accompanying drawings, like reference numerals refer to like elements throughout. Also, the size or thickness of each layer illustrated in the drawings may be exaggerated for convenience of explanation and clarity. Terms such as "first" and "second" are used herein merely to describe a variety of constituent elements, but the constituent elements are not limited by the terms. Such terms are used only for the purpose of distinguishing one constituent element from another constituent element.

An expression used in a singular form in the present specification also includes the expression in its plural form unless clearly specified otherwise in context. Throughout the specification, when a portion "includes" an element, another element may be further included, rather than excluding the existence of the other element, unless otherwise described. Also, in the following description, when a material layer is described to exist on another layer, the material layer may exist directly on the other layer or a third layer may be interposed therebetween. Since a material forming each layer in the following example embodiments is exemplary, other materials may be used therefor.

Terms such as a "portion", a "unit", a "module", and a "block" stated in the specification may signify a unit to process at least one function or operation and the unit may be embodied by hardware, software, or a combination of hardware and software.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of terms "a" and "an" and "the" and similar referents in the context of describing the disclosure (especially in the context of the following claims) are to be construed to cover both the singular and the plural.

The steps of all methods described herein can be performed in any suitable order unless otherwise indicated herein or otherwise clearly contradicted by context. The use of any and all examples, or language (e.g., "such as") provided herein, is intended merely to better illuminate the disclosure and does not pose a limitation on the scope of the disclosure unless otherwise claimed.

FIG. 1 illustrates an optical apparatus 100 according to an example embodiment.

The optical apparatus 100 may include a display panel 110 configured to form an image, a first polarization rotator 120 configured to electrically control a polarization state of light emitted from the display panel 110, a first ¼ wave plate 130 configured to convert the polarization of the light emitted from the first polarization rotator 120, and an optical element group OG configured to display a first image and a second image having different viewing angles according to polarization states of light from the first ¼ wave plate 130.

The display panel 110 may include, for example, an liquid crystal display (LCD), a liquid crystal on silicon (LCoS), an organic light emitting diode (OLED) display, or an LED display. The first polarization rotator 120 may electrically control the polarization state of an incident light. The first polarization rotator 120 may selectively convert the incident light into light of linear polarization. For example, the first polarization rotator 120 may selectively convert the incident light into light of a first linear polarization, for example, S polarization or second linear polarization, for example, P polarization.

The first ¼ wave plate 130 may convert the polarization of the light emitted from the first polarization rotator 120. The first ¼ wave plate 130 may convert the linear polarization into circular polarization. For example, the first ¼ wave plate 130 may convert the S polarization into right circular polarization and the P polarization into left circular polarization.

The optical element group OG may be configured to display the first image having a first viewing angle and the second image having a second viewing angle according to a polarization state of light from the first ¼ wave plate 130. The second viewing angle may be greater than the first viewing angle. The first image may include a high resolution fovea image, and the second image may include a low resolution peripheral image.

The fovea image may be an image corresponding to a fovea area at the center of a person's field of view, and the peripheral image may be an image corresponding to an area at the periphery of the fovea area. The fovea image may be provided at a relatively high resolution, and the peripheral image may be provided at a relatively lower resolution than that of the fovea image. Thus, compared to processing the entire image at the high resolution, the image processing calculation amount may be reduced, thereby increasing the image processing speed and increasing a frame rate. Such a display system may be a foveated display system. The foveated display system may be applied to a display having a wide viewing angle, such as a near-eye display apparatus when it is more difficult to process the entire area as a high resolution image.

The optical element group OG may be configured to operate as a concave lens or a convex lens according to the polarization state of light. The optical element group OG may include at least one geometric phase lens.

The optical element group OG may include a first geometric phase lens set 140 and a second geometric phase lens set 180. The first geometric phase lens set 140 may include a first geometric phase lens 141, a second geometric phase lens 143, and a first circular polarizer 142 provided between the first geometric phase lens 141 and the second geometric phase lens 143.

The second geometric phase lens set 180 may include a third geometric phase lens 181, a fourth geometric phase lens 183, and a second circular polarizer 182 provided between the third geometric phase lens 181 and the fourth geometric phase lens 183. The first circular polarizer 142 and the second circular polarizer 182 may convert the polarization of light into different circular polarizations.

Between the first geometric phase lens set 140 and the second geometric phase lens set 180, a second ¼ wave plate 150, a second polarization rotator 160, and a third ¼ wave plate 170 may be provided. The second polarization rotator 160 may convert a linear polarization state to be opposite to the first polarization rotator 150.

At least one lens that images the light from the optical element group OG may be further provided. In FIG. 1, a lens 190 may be provided after the second geometric phase lens set 180 opposite to the second polarization rotator 160. The lens 190 may form light and may be an eyepiece.

The operation of the optical apparatus 100 will be described according to example embodiments.

Figure 2:
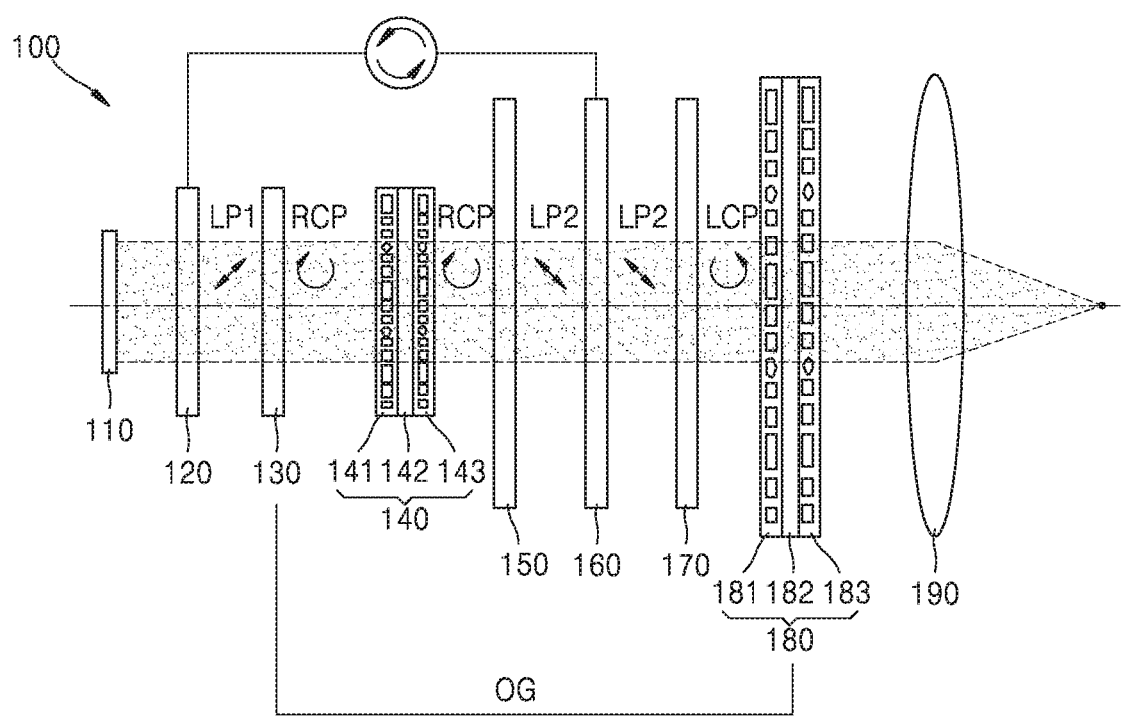
FIG. 2 is a diagram illustrating an operation performed by an optical apparatus to display a high resolution image according to an example embodiment.

FIG. 2 illustrates the optical apparatus 100 displaying a high resolution image having a narrow viewing angle according to an example embodiment.

A light emitted from the display panel 110 may be converted to light of a first linear polarization LP1, for example, an S polarization, according to operation of the first polarization rotator 120. The light of the first linear polarization LP1 may be converted into a light of right circular polarization RCP by the first ¼ wave plate 130.

Next, operations of the first geometric phase lens set 140 and the second geometric phase lens set 180 will be described.

Figure 3:
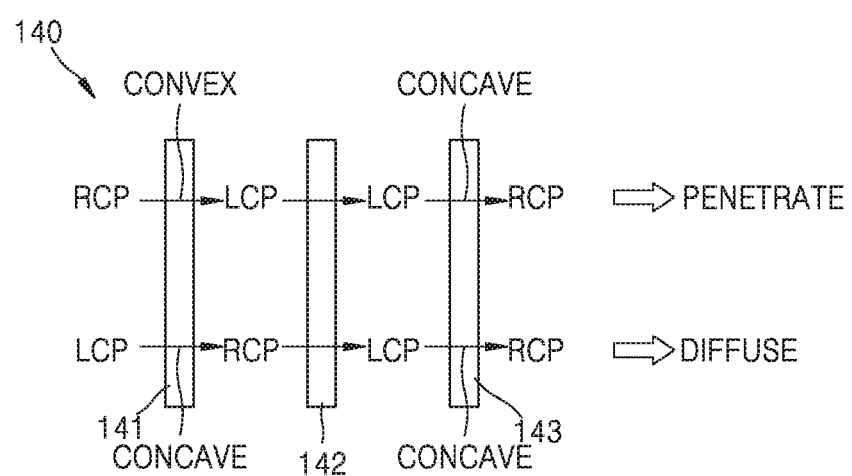
FIG. 3 is a diagram illustrating an operation of a first geometric phase lens set included in an optical apparatus according to an example embodiment.

FIG. 3 is a diagram illustrating an operation of the first geometric phase lens set 140 according to an example embodiment. The operation of the first geometric phase lens set 140 will be described with respect to the right circular polarization RCP and left circular polarization LCP.

A geometric phase lens may convert light of the right circular polarization RCP into light of the left circular polarization LCP, and may operate as a convex lens. In addition, the geometric phase lens may convert light of the left circular polarization LCP into light of the right circular polarization RCP, and may operate as a concave lens. As described above, the geometric phase lens may operate as the convex lens or the concave lens according to the polarization state of an incident light.

With respect to light of the right circular polarization RCP, the operation of the first geometric phase lens set 140 is as follows. Light of the right circular polarization RCP may be converted into light of the left circular polarization LCP by the first geometric phase lens 141, and the first geometric phase lens 141 may operate as the convex lens. Then, the first circular polarizer 142 may convert the incident light into the first circular polarization, for example, the right circular polarization RCP. Light of the right circular polarization RCP passing through the first geometric phase lens 141 may pass through the first circular polarizer 142 and be converted to have the left circular polarization LCP. Light of the left circular polarization LCP may be converted to have the right circular polarization RCP by the second geometric phase lens 143, and the second geometric phase lens 143 may operate as the concave lens. Therefore, when the light of the right circular polarization RCP is incident on the first geometric phase lens set 140, the first geometric phase lens 141 may operate as the convex lens, and the second geometric phase lens 143 may operates as the concave lens. Therefore, as a result, by the optical offset action of the convex lens and the concave lens, the first geometric phase lens set 140 may operate as a transparent plate, and the light of the right circular polarization RCP may pass through the first geometric phase lens set 140 as is.

With respect to light of the left circular polarization LCP, the operation of the first geometric phase lens set 140 is as follows. Light of the left circular polarization LCP may be converted to have the right circular polarization RCP by the first geometric phase lens 141, and at this time, the first geometric phase lens 141 may operate as the concave lens. The light of the right circular polarization RCP passing through the first geometric phase lens 141 may be converted to have the left circular polarization LCP by the first circular polarizer 142. Light of the left circular polarization LCP may be converted to have the right circular polarization RCP by the second geometric phase lens 143, and at this time, the second geometric phase lens 143 may operate as the concave lens. Therefore, when the light of the left circular polarization LCP is incident on the first geometric phase lens set 140, because the first geometric phase lens 141 operates as the concave lens, and the second geometric phase lens 143 operates as the concave lens, the light of the left circular polarization LCP may be diffused by the first geometric phase lens set 140.

Figure 4:
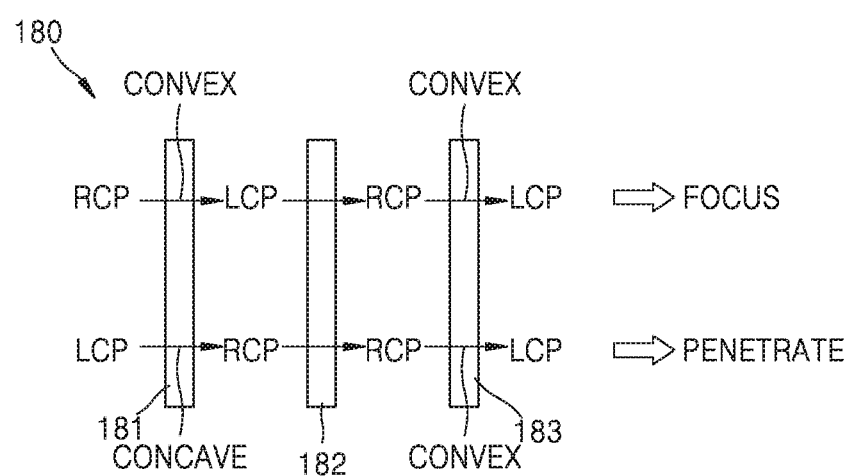
FIG. 4 is a diagram illustrating an operation of a second geometric phase lens set included in an optical apparatus according to an example embodiment.

FIG. 4 is a diagram illustrating an operation of the second geometric phase lens set 180 according to an example embodiment. The operation of the second geometric phase lens set 180 will be described with respect to the right circular polarization RCP and the left circular polarization LCP.

With respect to light of the right circular polarization RCP, the operation of the second geometric phase lens set 180 is as follows. Light of the right circular polarization RCP may be converted to have the left circular polarization LCP by the third geometric phase lens 181, and at this time, the third geometric phase lens 181 may operate as a convex lens. The light of the left circular polarization LCP passing through the third geometric phase lens 181 may be converted to have the right circular polarization RCP by the second circular polarizer 182. The light of the right circular polarization RCP may be converted to have the left circular polarization LCP by the fourth geometric phase lens 183, and at this time, the fourth geometric phase lens 183 may operate as a convex lens. Accordingly, when the light of the right circular polarization RCP is incident on the second geometric phase lens set 180, because the third geometric phase lens 181 operates as the convex lens, and the second geometric phase lens 183 operates as the convex lens, the light of the right circular polarization RCP may be focused by the second geometric phase lens set 180.

With respect to light of the left circular polarization LCP, the operation of the second geometric phase lens set 180 is as follows. Light of the left circular polarization LCP may be converted to have the right circular polarization RCP by the third geometric phase lens 181, and at this time, the third geometric phase lens 181 may operate as a concave lens. The light of the right circular polarization RCP passing through the first geometric phase lens 181 may pass through the second circular polarizer 182 as is. The light of the right circular polarization RCP may be converted to have the left circular polarization LCP by the fourth geometric phase lens 183, and at this time, the fourth geometric phase lens 183 may operate as the convex lens. Therefore, when the light of the left circular polarization LCP is incident on the second geometric phase lens set 180, the third geometric phase lens 181 may operate as the concave lens, and the fourth geometric phase lens 183 may operate as the convex lens. Therefore, as a result, by the optical offset action of the concave lens and the convex lens, the second geometric phase lens set 180 may operate as a transparent plate, and the left circular polarization LCP may pass through the second geometric phase lens set 180 as is.

Referring to FIG. 2 again, the light of the right circular polarization RCP from the first ¼ wave plate 130 may pass through as is according to operation of the first geometric phase lens set 140 as described above. Then, the light of the right circular polarization RCP may be converted to have the second linear polarization LP2, for example, P polarization, by the second ¼ wave plate 140. The second polarization rotator 160 may electrically control the polarization direction of an incident light. The second polarization rotator 160 may convert, for example, the polarization of the incident light into the second linear polarization LP2. Therefore, the second linear polarization LP2 may pass through the second polarization rotator 160 as is. The second linear polarization LP2 may be converted into the left circular polarization LCP by the third ¼ wave plate 170.

Referring to FIG. 4, with respect to light of the left circular polarization LCP, the second geometric phase lens set 180 may transmit light as is. In addition, the light may be formed in the user's eye by the lens 190.

Accordingly, when light of the right circular polarization RCP is incident on the first geometric phase lens set 140, an image of the display panel 110 may be formed without receiving any optical effect. Because the image of the display panel 110 is transferred without being enlarged, the image may be applied to a high resolution image of a size suitable for a fovea image.

Figure 5:
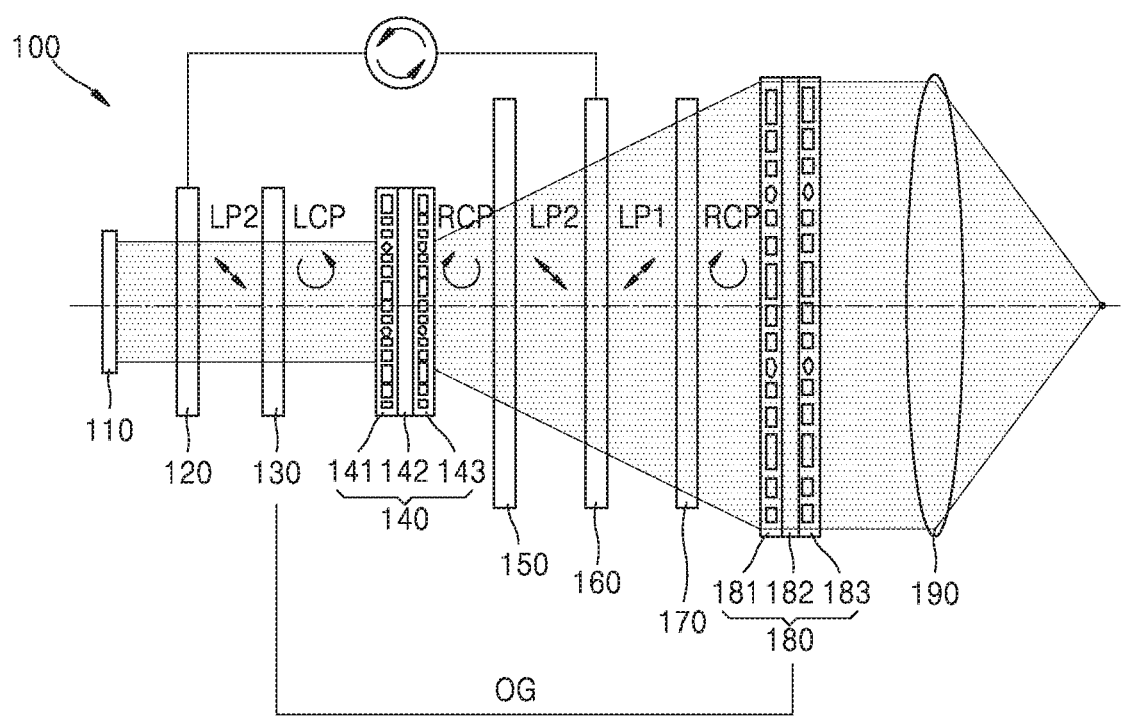
FIG. 5 is a diagram illustrating an operation performed by an optical apparatus to display a low resolution image according to an example embodiment.

FIG. 5 illustrates the optical apparatus 100 displaying a low resolution image having a wide viewing angle according to an example embodiment.

A light emitted from the display panel 110 may be light of the second linear polarization LP2, for example, P polarization, by the first polarization rotator 120. Light of the second linear polarization LP2 may be converted into the left circular polarization LCP by the first ¼ wave plate 130.

Referring to FIG. 3, the light of the left circular polarization LCP may be converted to have the right circular polarization RCP by the first geometric phase lens set 140, and the first geometric phase lens set 140 may operate as a concave lens to diffuse light.

Subsequently, the light of the right circular polarization RCP may be converted to have the second linear polarization LP2 by the second ¼ wave plate 150, and the light of the second linear polarization LP2 may be converted to have the first linear polarization LP1 by the second polarization rotator 160. The light of the first linear polarization LP1 may be converted to have the right circular polarization RCP by the third ¼ wave plate 170 and may be incident on the second geometric phase lens set 180. Referring to FIG. 4, the light of the right circular polarization RCP may be converted to have the left circular polarization LCP by the second geometric phase lens set 180, and the second geometric phase lens set 180 may operate as a convex lens to focus light.

The first geometric phase lens set 140 and the second geometric phase lens set 180 may share the same focal position. At this time, the light passing through the second geometric phase lens set 180 may be parallel light. An image transferred through the parallel light may pass through the lens 190 and be formed on the user's eye. In this case, because the image of the display panel 110 is enlarged and transferred, the image of the display panel 110 may have a wide viewing angle and a relatively low resolution.

When a display apparatus is driven, a first image (a fovea image) displayed by the operation illustrated in FIG. 2 and a second image (a peripheral image) displayed by the operation illustrated in FIG. 5 may be sequentially provided to a user for each frame. At this time, an electrical signal for adjusting the first polarization rotator 120 and the second polarization rotator 160 and an image signal of the display panel 110 may be synchronized. In an operation of providing the first image, the display panel 110 may be synchronized to transmit a first image signal corresponding to a fovea area, the first polarization rotator 120 may be synchronized to generate light of the first linear polarization LP1, and the second polarization rotator 160 may be synchronized to generate light of the second linear polarization LP2. In an operation of providing the second image, the display panel 110 may be synchronized to transmit a second image signal corresponding to a peripheral area excluding the fovea area, the first polarization rotator 120 may be synchronized to generate light of the second linear polarization LP2, and the second polarization rotator 160 may be synchronized to generate light of the first linear polarization LP1. As this process proceeds at a fast frame rate, the user may view a natural foveated image.

Figure 6:
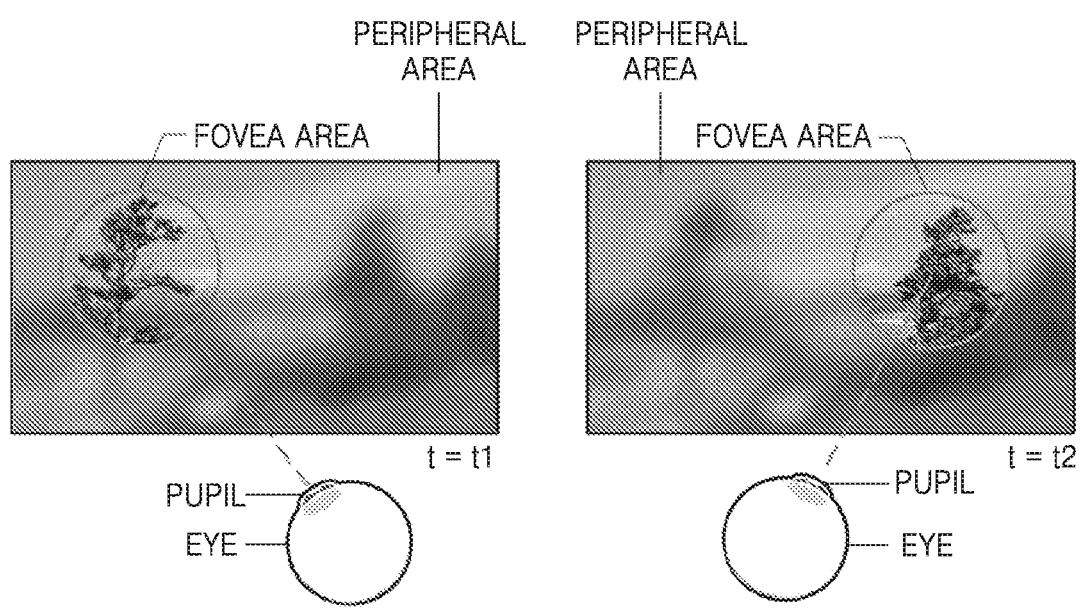
FIG. 6 is a diagram illustrating an operation of a foveated display system.

FIG. 6 shows a conceptual operation of a foveated display system. A person's gaze direction may be measured using a pupil tracker. The person's field of view may include a fovea area corresponding to a human pupil and a peripheral area in the periphery of the fovea area. For example, at a first time where t=t1 and a second time where t=t2, the fovea area and the peripheral area may be different. In the foveated display system, a relatively high resolution image having a narrow viewing angle may be provided to the fovea area and a relatively low resolution image having a wide viewing angle may be provided to the peripheral area. In general, a software method is used in the foveated display system. The software method may use a single display panel to render the fovea area with high resolution and the peripheral area with low resolution. Thus, the amount of calculation used to provide an image may be reduced.

In the example embodiment, while using a single display panel, an optical apparatus may be used to sequentially provide the high resolution first image (the fovea image) having a narrow viewing angle and the low resolution second image (the peripheral image) having a wide viewing angle, and a user may view a natural and high resolution image in which the first image and the second image are synthesized. Because a single display panel is used, color reproduction and uniformity between the first image and the second image may be higher than in the case of using two display panels.

Figure 7:
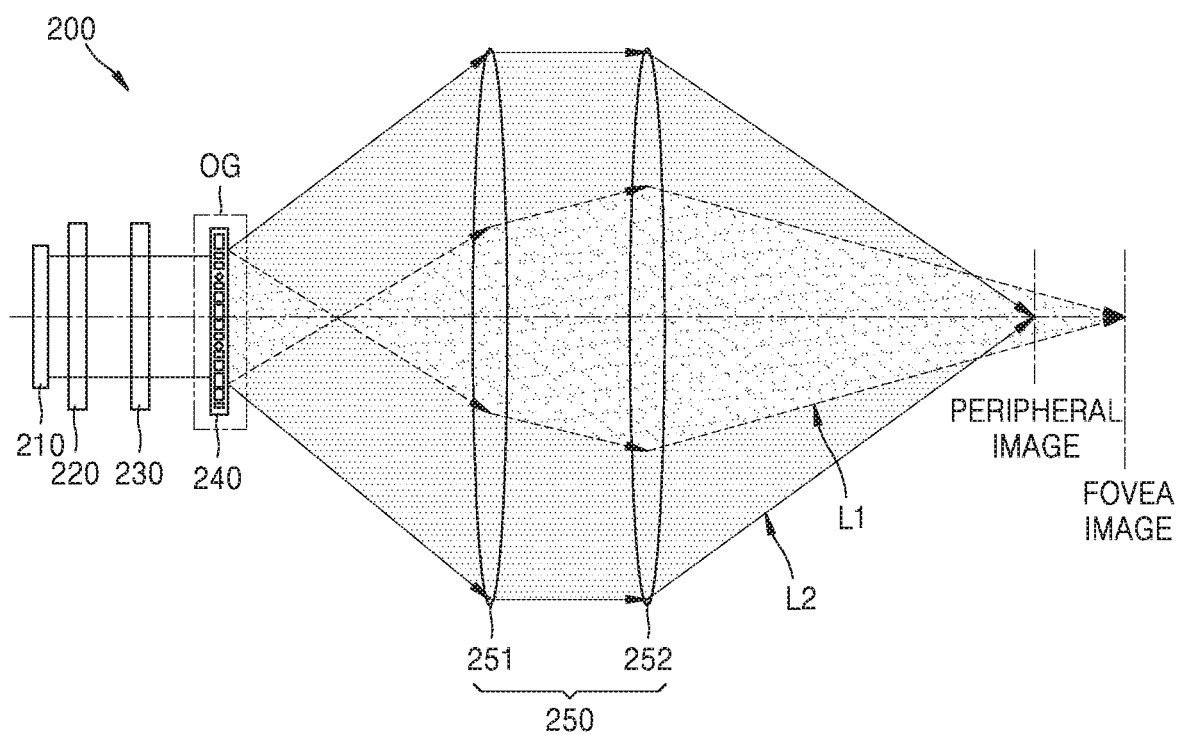
FIG. 7 illustrates an optical apparatus according to another example embodiment.

FIG. 7 illustrates an optical apparatus 200 according to another example embodiment.

The optical apparatus 200 may include a display panel 210 configured to form an image, a polarization rotator 220 configured to electrically control a polarization state of light emitted from the display panel 210, a first ¼ wave plate 230 configured to convert the polarization of light from the polarization rotator 220, and the optical element group OG configured to display a first image having a first viewing angle and a second image having a second viewing angle greater than the first viewing angle according to polarization states of light from the first ¼ wave plate 230.

The display panel 210 may include, for example, an LCD, a LCoS, an OLED display, or an LED display. The polarization rotator 220 may electrically control the polarization state of an incident light. The polarization rotator 220 may selectively convert the incident light to linear polarization. The polarization rotator 220 may selectively convert light of the incident light to first linear polarization, for example, S polarization or second linear polarization, for example, P polarization.

The ¼ wave plate 230 may convert the polarization of the light emitted from the polarization rotator 220. The ¼ wave plate 230 may convert light of the linear polarization to circular polarization. For example, the ¼ wave plate 230 may convert the S polarization to right circular polarization and the P polarization to left circular polarization.

The optical element group OG may include, for example, a geometric phase lens 240. The geometric phase lens 240 may convert light of the right circular polarization to light of the left circular polarization, and may operate as a convex lens. In addition, the geometric phase lens 240 may convert light of the left circular polarization to the right circular polarization, and may operate as a concave lens.

At least one lens 250 that forms the light from the geometric phase lens 240 may be further provided. For example, a first lens 251 and a second lens 252 may be provided after the geometric phase lens 240 opposite to the ¼ wave plate 230.

The operation of the optical apparatus 200 will be described according to an example embodiment.

A light emitted from the display panel 210 may be converted to the first linear polarization, for example, the S polarization, by the polarization rotator 220. Light of the first linear polarization may be converted to light of the right circular polarization RCP by the ¼ wave plate 230. Light of the right circular polarization RCP may be converted to light of the left circular polarization LCP by the geometric phase lens 240, and at this time, the geometric phase lens 240 may operate as the convex lens. Accordingly, a first light L1 passing through the geometric phase lens 240 may be focused and may be formed through a first lens 251 and a second lens 252. In this case, because the first light L1 is focused, a high resolution first image (a fovea image) having a relatively narrow viewing angle may be provided.

The light emitted from the display panel 210 may be converted to the second linear polarization, for example, the P polarization, by the polarization rotator 220. The polarization rotator 220 may electrically control a polarization state. Light of the second linear polarization may be converted to light of the left circular polarization LCP by the ¼ wave plate 230. Light of the left circular polarization LCP may be converted to light of the right circular polarization RCP by the geometric phase lens 240, and the geometric phase lens 240 may operate as a concave lens. Accordingly, a second light L2 passing through the geometric phase lens 240 may be diffused and may be formed through the first lens 251 and the second lens 252. In this case, because the second light L2 is diffused, a low resolution second image (a peripheral image) having a relatively wide viewing angle may be provided. The first image and the second image may be sequentially provided by synchronizing an image signal of the display panel 210 and an electrical signal of the polarization rotator 220.

In the example embodiment, the configuration of the optical element group OG is simple, and thus the volume of the entire optical apparatus 200 may be reduced, and the manufacturing cost may be lowered. However, there may be a difference in the focus between the first image and the second image. In this case, the difference in the focus between the first image and the second image may be reduced by using the at least one lens 250.

Figure 8:
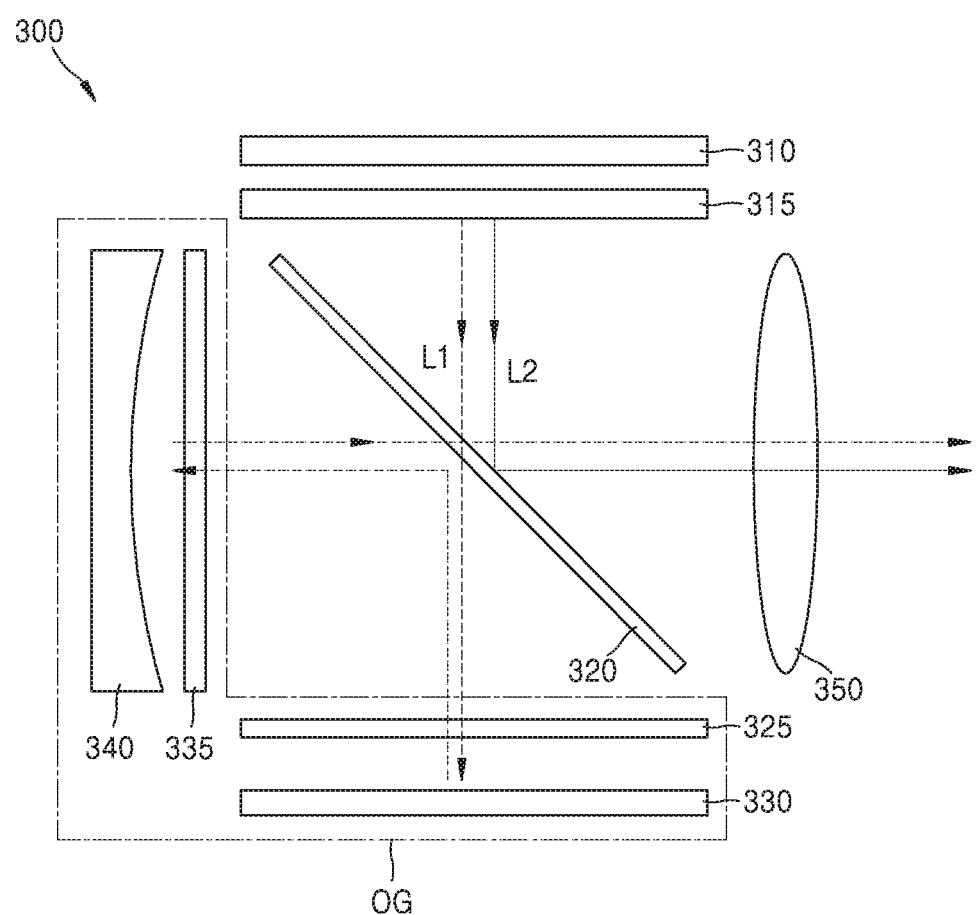
FIG. 8 illustrates an optical apparatus according to another example embodiment.

FIG. 8 illustrates an optical apparatus 300 according to another example embodiment.

The optical apparatus 300 may include a display panel 310 configured to form an image, a polarizer 315 configured to convert light from the display panel 310 to have at least one of first linear polarization and second linear polarization, a polarization beam splitter 320 configured to transmit the first light L1 having the first linear polarization and to reflect the second light L2 having the second linear polarization, and the optical element group OG configured to allow the first light L1 penetrating the polarization beam splitter 320 to travel in a path different from the second light L2. At least one lens 350 that forms the second light L2 reflected from the polarization beam splitter 320 and the first light L1 from the optical element group OG may be further provided.

The first light L1 may display a first image having a first viewing angle and the second light L2 may display a second image having a second viewing angle greater than the first viewing angle. The first image may include a high resolution fovea image, and the second image may include a low resolution peripheral image.

The polarizer 315 may be, for example, a polarization rotator capable of electrically controlling the polarization state. The polarizer 315 may selectively convert an incident light to first linear polarization, for example, S polarization or second linear polarization, for example, P polarization.

The optical element group OG may include, for example, a first ¼ wave plate 325 that converts the polarization of the first light L1 passing through the polarization beam splitter 320, a first mirror 330 that reflects the first light L1 passing through the first ¼ wave plate 325 back to the first ¼ wave plate 325, a second first ¼ wave plate 335 that converts the polarization of the first light L1 passing through the first ¼ wave plate 325 and reflected by the polarization beam splitter 320, and a second mirror 340 that reflects the first light L1 passing through the second ¼ wave plate 335 back to the second ¼ wave plate 335.

At least one of the first mirror 330 and the second mirror 340 may be a concave mirror. For example, the first mirror 330 may be a flat mirror, and the second mirror 340 may be the concave mirror. However, embodiments are not limited thereto, and may be modified in various ways.

The operation of the optical apparatus 300 will be described according to an example embodiment.

A light emitted from the display panel 310 may be converted to the first light L1 having the first linear polarization by the polarizer 315. The first light L1 may pass through the polarization beam splitter 320 and may be converted to light of the left circular polarization LCP by the first ¼ wave plate 325. Light of the left circular polarization LCP may be converted to the right circular polarization RCP while being reflected by the mirror 330, and may be converted to the first linear polarization by the first ¼ wave plate 325. Light of the first linear polarization may be reflected by the polarization beam splitter 320 and incident on the second ¼ wave plate 335. Light of the first linear polarization may be converted to the right circular polarization RCP by the second ¼ wave plate 335, converted to the left circular polarization LCP by being reflected by the second mirror 340, and converted to the second linear polarization by the second ¼ wave plate 335. Because the second mirror 340 is the concave mirror, the first light L1 reflected by the second mirror 340 may be focused. The first light L1 of the second linear polarization may transmit the polarization beam splitter 320 and be formed by the lens 350. Thus, the first image (a fovea image) may be provided. The first image may be focused by the second mirror 340 and provided as a high resolution image having a relatively small viewing angle.

Next, the light emitted from the display panel 310 may be converted into the second light L2 having the second linear polarization by the polarizer 315. The second light L2 may be reflected by the polarization beam splitter 320 and formed through the lens 350. Thus, the second image (a peripheral image) may be provided. The second image may be provided as a low resolution image having a relatively wide viewing angle compared to the first image because an image from the display panel 310 is formed by the lens 350 as is.

At least one of the first mirror 330 and the second mirror 340 may be mechanically or electrically moved two-dimensionally or three-dimensionally. Thus, the traveling direction of the first light L1 may be changed.

In the example embodiment, the specification of an optical element (a mirror, a lens, etc.) on the optical path may be changed by allowing light of different polarizations to travel in different optical paths and to have different viewing angles in each optical path, thereby more easily providing a high resolution image and a low resolution image.

Figure 9:
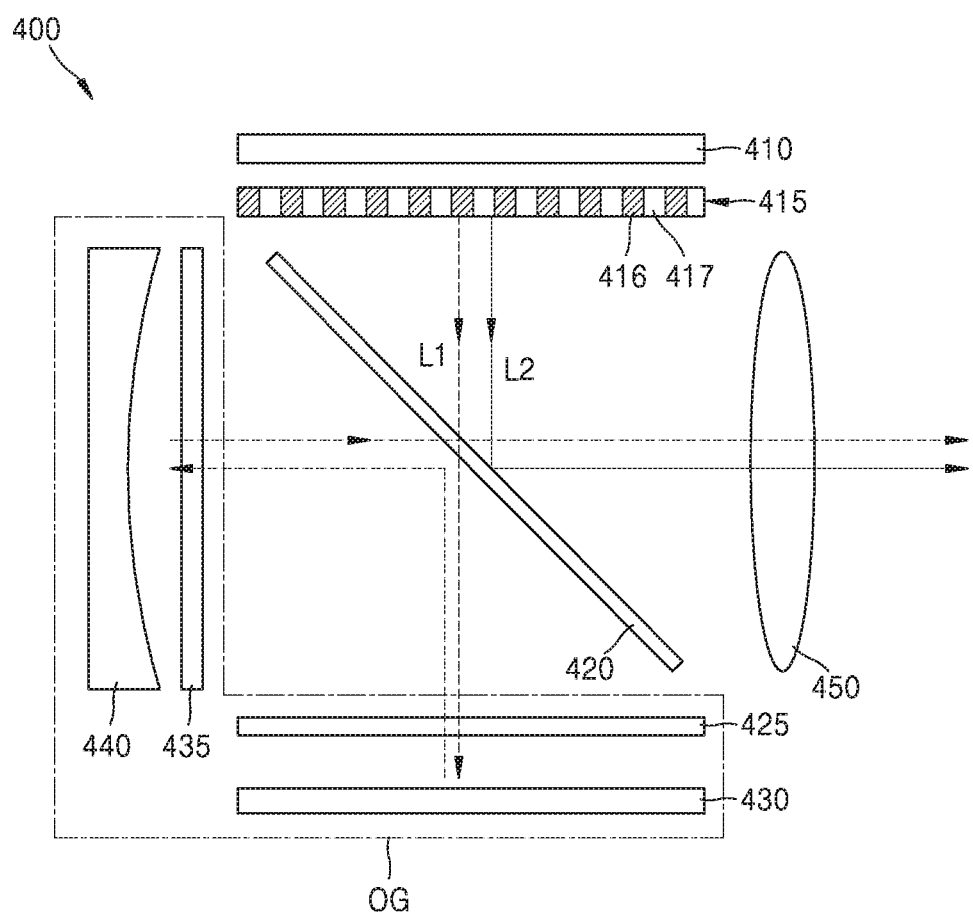
FIG. 9 illustrates an optical apparatus according to another example embodiment.

FIG. 9 illustrates an optical apparatus 400 according to another example embodiment.

The optical apparatus 400 may include a display panel 410 configured to form an image, a polarizer 415 configured to convert light from the display panel 410 to have a first linear polarization and a second linear polarization, a polarization beam splitter 420 configured to transmit the first light L1 having the first linear polarization and reflect the second light L2 having the second linear polarization, and the optical element group OG configured to allow the first light L1 passing through the polarization beam splitter 420 to travel in a path different from the second light L2. At least one lens 450 that images the first light L1 from the optical element group OG and the second light L2 reflected from the polarization beam splitter 420 may be further provided.

The first light L1 may display a first image having a first viewing angle and the second light L2 may display a second image having a second viewing angle greater than the first viewing angle. The first image may include a high resolution fovea image, and the second image may include a low resolution peripheral image.

The polarizer 415 may include, for example, a patterned retarder. The patterned retarder may have a structure in which a first retarder 416 that converts an incident light into light of a first linear polarization, for example, S polarization, and a second retarder 417 that converts the incident light into light of a second linear polarization, for example, P polarization, are alternately arranged. The first retarder 416 and the second retarder 417 may be arranged in one dimension or may be arranged in the form of a two-dimensional matrix. The first retarder 416 and the second retarder 417 may be arranged to correspond to pixels of the display panel 410. The display panel 410 may form a first image on ½ of all pixels and a second image on the other ½. For example, the display panel 410 may form the first image in odd pixels and the second image in even pixels. Also, the first retarder 416 may convert polarization of light corresponding to the odd pixels, and the second retarder 417 may convert polarization of light corresponding to the even pixels.

The optical element group OG may include, for example, a first ¼ wave plate 425 that converts the polarization of the first light L1 passing through the polarization beam splitter 420, a first mirror 430 that reflects the first light L1 passing through the first ¼ wave plate 425 back to the first ¼ wave plate 425, a second first ¼ wave plate 435 that converts the polarization of the first light L1 passing through the first ¼ wave plate 425 and reflected by the polarization beam splitter 420, and a second mirror 440 that reflects the first light L1 passing through the second ¼ wave plate 435 back to the second ¼ wave plate 435.

At least one of the first mirror 430 and the second mirror 440 may be a concave mirror. For example, the first mirror 430 may be a flat mirror, and the second mirror 440 may be the concave mirror. However, embodiments are not limited thereto, and may be modified in various ways.

The operation of the optical apparatus 400 will be described according to an example embodiment.

A light emitted from the display panel 410 may be converted to the first light L1 having the first linear polarization and the second light L2 having the second linear polarization according to the pattern of the polarizer 415.

The first light L1 may pass through the polarization beam splitter 420 and may be converted to light of the left circular polarization LCP by the first ¼ wave plate 425. Light of the left circular polarization LCP may be converted to light of the right circular polarization RCP while being reflected by the mirror 430, and may be converted to light of the first linear polarization by the first ¼ wave plate 425. Light of the first linear polarization may be reflected by the polarization beam splitter 420 and incident on the second ¼ wave plate 435. Light of the first linear polarization may be converted to light of the right circular polarization RCP by the second ¼ wave plate 435, converted to light of the left circular polarization LCP by being reflected by the second mirror 440, and converted to light of the second linear polarization by the second ¼ wave plate 435. Because the second mirror 440 is the concave mirror, the first light L1 reflected by the second mirror 440 may be focused. The first light L1 of the second linear polarization may pass through the polarization beam splitter 420 and be imaged by the lens 450. Thus, the first image (a fovea image) may be provided. The first image may be focused by the second mirror 440 and provided as a high resolution image having a relatively small viewing angle.

The second light L2 may be reflected by the polarization beam splitter 420 and formed through the lens 450. Thus, the second image (a peripheral image) may be provided. The second image may be provided as a low resolution image having a relatively wide viewing angle compared to the first image because an image from the display panel 410 is formed by the lens 450 as is.

At least one of the first mirror 430 and the second mirror 440 may be mechanically or electrically moved two-dimensionally or three-dimensionally. Thus, the traveling direction of the first light L1 may be changed.

In the example embodiment, because the first image and the second image are simultaneously displayed using the polarizer 415 having a structure corresponding to the pixels of the display panel 410, the resolution of each image may be reduced. Meanwhile, a foveated display may be more simply implemented without an active element.

Figure 10:
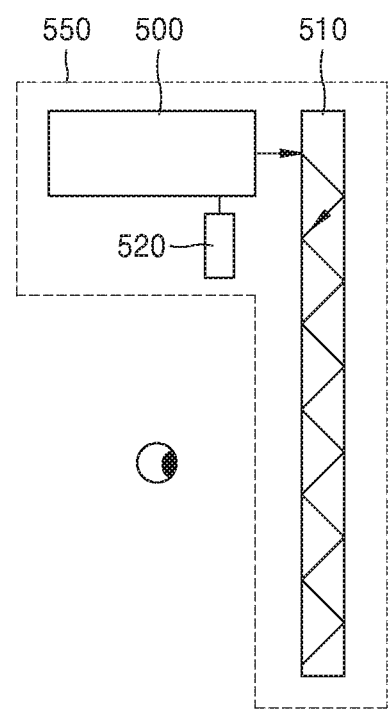
FIG. 10 illustrates a near-eye display apparatus according to an example embodiment.

FIG. 10 illustrates a near-eye display apparatus 550 according to an example embodiment.

The near-eye display apparatus 550 may include a pupil tracker 520 that tracks a user's pupil, an optical apparatus 500 configured to display a first image having a first viewing angle and a second image having a second viewing angle greater than the first viewing angle, and an optical element 510 that directs the first image and the second image to the user's eyes.

The first image may include an image corresponding to the position of the pupil detected by the pupil tracker 520. The second image may include a peripheral image of the first image. The optical element 510 may include, for example, a waveguide.

As the optical apparatus 500, the optical apparatuses 100, 200, 300, and 400 shown in FIGS. 1 to 9 may be applied. The near-eye display apparatus 550 may be applied to an eyeglasses-type virtual reality apparatus or an eyeglasses-type augmented reality apparatus, or a head-up display.

Figure 11:
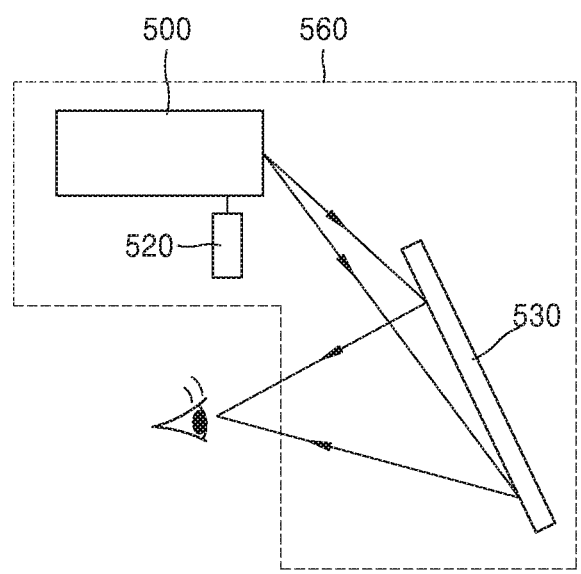
FIG. 11 illustrates a near-eye display apparatus according to an example embodiment.

FIG. 11 illustrates a near-eye display apparatus 560 according to an example embodiment.

The near-eye display apparatus 560 is different in that the optical element 530 includes a hologram optical element when compared with FIG. 10, and the remaining components are the same.

A foveated rendering technology may be applied to the near-eye display apparatuses 550 and 560. Foveated rendering is a virtual reality or augmented reality technology that follows the movement of the pupil and shows an image similar to a real field of view. When a person is looking at a certain direction or object, a part entering the center of the field of view may be seen clearly and a peripheral part may be seen blurrily, thereby reducing the amount of image processing calculation and increasing the image processing speed.

Near-eye display apparatuses according to various example embodiments may be applied to various fields such as entertainment, education, and medicine.

Near-eye display apparatuses according to various example embodiments may use a single display panel and display two images having different viewing angles and resolutions using an optical apparatuses, and thus structures thereof may be simple and compact compared to the case of using two display panels. In addition, there are disadvantages in that when two display panels are used, each display panel must be synchronized in real time while being driven independently, and the size of the overall system increases. In addition, because characteristics of the two display panels are different from each other, complicated calculation processing for matching color characteristics between images is required. Meanwhile, because near-eye display apparatuses according to various example embodiments use a single display panel, the difference in the color characteristics between two images is relatively small, and thus calculation processing for matching the color characteristics may be more simplified.

An optical apparatus according to the example embodiment may provide a high resolution image with a narrow viewing angle and a low resolution image with a wide viewing angle using one display panel.

The optical apparatus according to the example embodiment may use a single display panel, thereby reducing differences in the color reproduction and uniformity between two images.

A near-eye display apparatus including the optical apparatus according to the example embodiment may reduce the amount of calculation for image processing while using a single display panel, thereby increasing the image display speed.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims.

What is claimed is:

1. An optical apparatus comprising:
a display panel configured to form an image;
a first polarization rotator configured to electrically control a polarization state of a light emitted from the display panel to be a first polarization state;
a first ¼ wave plate configured to convert a polarization state of a light transmitted from the first polarization rotator from the first polarization state to a second polarization state; and
an optical element group configured to display a first image having a first viewing angle and a second image having a second viewing angle based on the second polarization state of a light transmitted from the first ¼ wave plate, the second viewing angle being greater than the first viewing angle,
wherein the first image comprises a high resolution fovea image, and the second image comprises a low resolution peripheral image.

2. The optical apparatus of claim 1, wherein the optical element group comprises at least one geometric phase lens configured to operate as a concave lens or a convex lens based on a polarization state of a light incident thereon.

3. The optical apparatus of claim 1, wherein the optical element group comprises a first geometric phase lens set configured to transmit or diffuse light incident thereon, and a second geometric phase lens set configured to transmit or focus a light incident thereon.

4. The optical apparatus of claim 3, wherein the first geometric phase lens set comprises a first geometric phase lens, a second geometric phase lens, and a first circular polarizer provided between the first geometric phase lens and the second geometric phase lens.

5. The optical apparatus of claim 3, wherein the second geometric phase lens set comprises a third geometric phase lens, a fourth geometric phase lens, and a second circular polarizer provided between the third geometric phase lens and the fourth geometric phase lens.

6. The optical apparatus of claim 3, wherein the optical element group further comprises a second ¼ wave plate, a second polarization rotator, and a third ¼ wave plate respectively provided between the first geometric phase lens set and the second geometric phase lens set.

7. The optical apparatus of claim 1, further comprising at least one lens configured to image a light transmitted from the optical element group.

8. The optical apparatus of claim 1, wherein the first image and the second image are sequentially synthesized and displayed as one image.

9. An optical apparatus comprising:
a display panel configured to form an image;
a polarizer configured to convert a light emitted from the display panel to have at least one of a first linear polarization and a second linear polarization;
a polarization beam splitter configured to transmit a first light having the first linear polarization and reflect a second light having the second linear polarization; and
an optical element group configured to transmit the first light transmitted through the polarization beam splitter in a different path from the second light,
wherein the first light displays a first image having a first viewing angle, and the second light displays a second image having a second viewing angle that is greater than the first viewing angle, and
wherein the first image comprises a high resolution fovea image, and the second image comprises a low resolution peripheral image.

10. The optical apparatus of claim 9, wherein the polarizer comprises a polarization rotator or a patterned retarder.

11. The optical apparatus of claim 9, wherein the optical element group comprises:
a first ¼ wave plate configured to convert a polarization of the first light passing through the polarization beam splitter;
a first mirror configured to reflect the first light passing through the first ¼ wave plate back to the first ¼ wave plate;
a second first ¼ wave plate configured to convert the polarization of the first light passing through the first ¼ wave plate and reflected by the polarization beam splitter; and
a second mirror configured to reflect the first light passing through the second ¼ wave plate back to the second ¼ wave plate.

12. The optical apparatus of claim 11, wherein at least one of the first mirror and the second mirror comprises a concave mirror.

13. A near-eye display apparatus comprising:
a pupil tracker configured to track a pupil of a user;
an optical apparatus configured to display a first image having a first viewing angle corresponding to a position of the pupil detected by the pupil tracker and a second image having a second viewing angle that is greater than the first viewing angle; and
an optical element configured to direct the first image and the second image to eyes of the user,
wherein the optical apparatus comprises:
a display panel configured to form an image;
a first polarization rotator configured to electrically control a light emitted from the display panel to have a first polarization state;
a first ¼ wave plate configured to convert a polarization state of a light transmitted from the first polarization rotator from the first polarization state to a second polarization state; and
an optical element group configured to display the first image having the first viewing angle and the second image having the second viewing angle based on the second polarization state of a light transmitted from the first ¼ wave plate, and
wherein the first image comprises a high resolution fovea image, and the second image comprises a low resolution peripheral image.

14. The near-eye display apparatus of claim 13, wherein the optical element group comprises a first geometric phase lens set configured to transmit or diffuse a light, and a second geometric phase lens set configured to transmit or focus the light, wherein the first geometric phase lens set comprises a first geometric phase lens, a second geometric phase lens, and a first circular polarizer provided between the first geometric phase lens and the second geometric phase lens, and wherein the second geometric phase lens set comprises a third geometric phase lens, a fourth geometric phase lens, and a second circular polarizer provided between the third geometric phase lens and the fourth geometric phase lens.

15. The near-eye display apparatus of claim 14, wherein the optical element group further comprises a second ¼ wave plate, a second polarization rotator, and a third ¼ wave plate provided between the first geometric phase lens set and the second geometric phase lens set.

16. The near-eye display apparatus of claim 13, further comprising at least one lens configured to image a light transmitted from the optical element group.

17. The near-eye display apparatus of claim 13, wherein the optical element comprises a light guide plate or a hologram optical element.

18. The near-eye display apparatus of claim 13, wherein the near-eye display apparatus is implemented as an eyeglasses-type virtual reality apparatus, an eyeglasses-type augmented reality apparatus, or a head-up display.

* * * * *